United States Patent
Anderson et al.

(10) Patent No.: US 11,458,929 B1
(45) Date of Patent: Oct. 4, 2022

(54) UNLOCKING VEHICLE DOORS WITH FACIAL RECOGNITION

(71) Applicant: GM Cruise Holdings LLC, San Francisco, CA (US)

(72) Inventors: John Logan Anderson, San Francisco, CA (US); Robin Yang, San Francisco, CA (US); Jiajian Zhou, San Francisco, CA (US); Jackie Shannon, San Francisco, CA (US); Jun Zhou, San Francisco, CA (US); Divya Thakur, San Francisco, CA (US); Alex Van Dorn, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 16/409,339

(22) Filed: May 10, 2019

(51) Int. Cl.
| | |
|---|---|
| *G06K 9/00* | (2022.01) |
| *B60R 25/25* | (2013.01) |
| *G06Q 10/02* | (2012.01) |
| *G06Q 50/30* | (2012.01) |
| *G06V 40/16* | (2022.01) |

(52) U.S. Cl.
CPC ............ *B60R 25/25* (2013.01); *G06Q 10/02* (2013.01); *G06Q 50/30* (2013.01); *G06V 40/172* (2022.01)

(58) Field of Classification Search
CPC ...... G06Q 10/083; G06Q 10/02; G06Q 50/30; G07C 5/008; G07C 5/0808; G07C 9/00571; B60R 25/25; G06K 9/00288
See application file for complete search history.

(56) References Cited

U.S. PATENT DOCUMENTS

| | | | |
|---|---|---|---|
| 9,194,168 B1* | 11/2015 | Lu | B60R 25/24 |
| 9,552,564 B1* | 1/2017 | Martenis | G06Q 10/083 |
| 10,501,055 B1* | 12/2019 | Yi | B60R 25/257 |
| 2007/0092245 A1* | 4/2007 | Bazakos | G06K 9/00255 396/427 |
| 2008/0089561 A1* | 4/2008 | Zhang | G06K 9/00228 382/118 |
| 2013/0132091 A1* | 5/2013 | Skerpac | G06F 21/32 704/273 |
| 2014/0241574 A1* | 8/2014 | Wang | G06K 9/00221 382/103 |
| 2016/0161266 A1* | 6/2016 | Crawford | G01C 21/34 701/25 |
| 2017/0193627 A1* | 7/2017 | Urmson | G06Q 10/063114 |
| 2017/0327082 A1* | 11/2017 | Kamhi | B60H 1/00357 |
| 2018/0136655 A1* | 5/2018 | Kim | H04W 4/024 |
| 2018/0202822 A1* | 7/2018 | DeLizio | G01C 21/362 |
| 2019/0043326 A1* | 2/2019 | Madden | H04N 7/186 |

(Continued)

*Primary Examiner* — Yong Hang Jiang
(74) *Attorney, Agent, or Firm* — Polsinelli, PC

(57) ABSTRACT

The subject disclosure relates to ways to authenticate a rider/user of an autonomous vehicle (AV) using biometric data, such as facial recognition. A process of the disclosed technology can facilitate the automatic unlocking of an AV by performing steps that include: receiving a dispatch request associated with a user identifier (ID), receiving a recognition model that corresponds with the user ID, and receiving an image stream including images of pedestrian faces. In some aspects, the process can further include steps for: providing the images to the recognition model, and determining if a user represented in the images corresponds with the user ID. Systems and machine-readable media are also provided.

14 Claims, 5 Drawing Sheets

(56) References Cited

U.S. PATENT DOCUMENTS

2019/0051069 A1* 2/2019 Cooley .................. G10L 17/22
2019/0250622 A1* 8/2019 Nister .................. G05D 1/0231
2019/0318159 A1* 10/2019 Blanc-Paques ........ G06Q 50/30

* cited by examiner

UNLOCKING VEHICLE DOORS WITH FACIAL RECOGNITION

BACKGROUND

1. Technical Field

The subject technology provides solutions for authenticating a rider identity and in particular, for automatically unlocking an autonomous vehicle (AV) in response to the positive authentication of an approaching rider performed using facial recognition.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as verifying an identity of the rider(s) being picked up when initiating a new fare.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
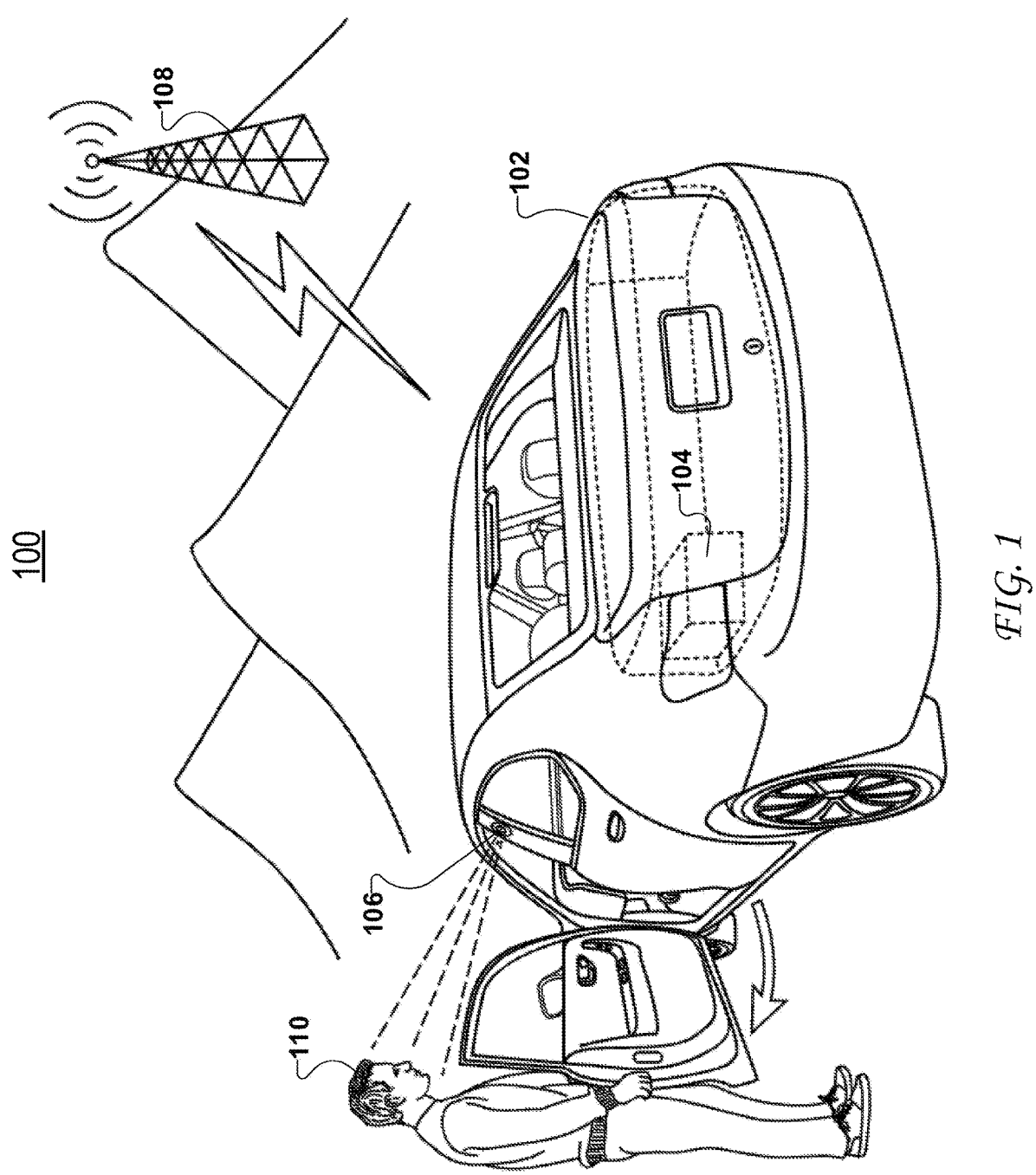
FIG. 1 illustrates an example environment in which some aspects of the disclosed technology can be implemented.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

One limitation in deploying AVs for use in a ride-sharing service is verifying an identity of a rider (or riders) that attempt to enter the vehicle. Conventional methods of performing user verification, such as requiring the entry of a passcode, or in authenticating a Bluetooth profile can be slow and cumbersome, thereby degrading the user experience. As such, there is a need for a frictionless, yet secure, authentication process that can enable properly authenticated users/riders to conveniently approach and enter a vehicle, without unnecessary delay.

Aspects of the disclosed technology address the foregoing limitations by providing solutions for quickly and conveniently authenticating AV passengers using facial recognition. In some aspects, user biometric profiles containing facial recognition features can be managed by an AV management system. The management system can be configured receive user biometric data, such as digitized facial images, and to train user-specific recognition models that can later be used to authenticate specific users. In some approaches, user/rider authentication is performed on-site, e.g., by an AV computing system, enabling rider authentication to be performed even if/when the AV loses network connectivity. As discussed in further detail below, recognition models for a specific rider, e.g., associated with a specific user identifier, can be received at the AV computing system upon dispatch and used to validate the rider's identity at pick-up. For example, the recognition model can be used to authenticate (classify) images pulled from an image stream received from one or more AV cameras. As such, upon approach, the AV computing system can automatically authenticate a valid rider, and perform additional actions, such as unlock the vehicle, or open one or more vehicle doors.

In some implementations, image streams from successful rider authentication sessions can be used to perform additional training/updating the rider's corresponding authentication model. As such, authentication model accuracy can improve over time while also shifting to accommodate variance and changes in user/rider appearance. A more detailed, description of various embodiments of the disclosed technology is provided with respect to FIGS. 1-5, below.

FIG. 1 illustrates an example environment 100 in which some aspects of the disclosed technology can be implemented. Environment 100 includes an autonomous vehicle (AV) 102 having a local computing system 104 (e.g., AV computing system), that is coupled to an image collection device (camera) 106. AV computing system 104 is configured for wireless communication with a computer network, for example, via a wireless base station 108. It is understood that image collection device 106 can include one or more cameras, i.e., charged-coupled devices (CCDs), for example, which are disposed at various locations around AV 102. Additionally, AV computing system 104 can be configured to wirelessly transact data (e.g., via base station 108) with a remote AV management system (not illustrated). Data sent and received by AV computing system 104 can be configured for transport over any a variety of computer networks, including but not limited to one or more cellular networks, Local Area Networks (LANs), Wide Area Networks (WANs), or a network of networks, such as the Internet.

In practice, AV 102 is configured to receive a dispatch request from the remote AV management system, indicating a user/rider 110 and location where rider 110 is to be picked up and/or dropped off. The dispatch request can include rider 110 identifying information (e.g., a unique user ID). In some implementations, the dispatch request can also include one or more recognition models that can be used to authenticate an identity of rider/user 110.

Once AV 102 arrives at a location indicated by the dispatch request, AV computing system 104 can begin processing image streams pulled from one or more of image collection devices (cameras) 106. The retrieval of image streams from camera 106 can be triggered in different ways, depending on the desired implementation. For example, AV computing system 104 can begin pulling image streams upon reaching geo-location coordinates indicated by the dispatch request. Alternatively, AV computing system 104 may begin pulling images from camera 106 in response to the detection of a pedestrian approach or attempt to enter AV 102.

AV computing system 104 can process digitized images from the camera stream, including images containing pedestrian faces of potential riders matching a user ID identified by the dispatch request. That is, computing system 104 can use the recognition model associated with a user ID of the requesting rider 110 to validate the rider's identity, i.e., to classify pedestrian face images as rider/not-rider. Facial images that are determined, using the recognition model, to match the associated user ID, can be used to cause AV 102 to unlock and/or open one or more doors to enable rider 110 to enter the vehicle. Alternatively, AV 102 can be configured to take no action for images not determined to match the associated user ID. In such instances, AV computing system 104 can continue to process the image stream received from collection system 106, until an affirmative match is identified. Various aspects of the process for performing rider authentication are discussed in greater detail with respect to the communication timing diagram of FIG. 2.

Figure 2:
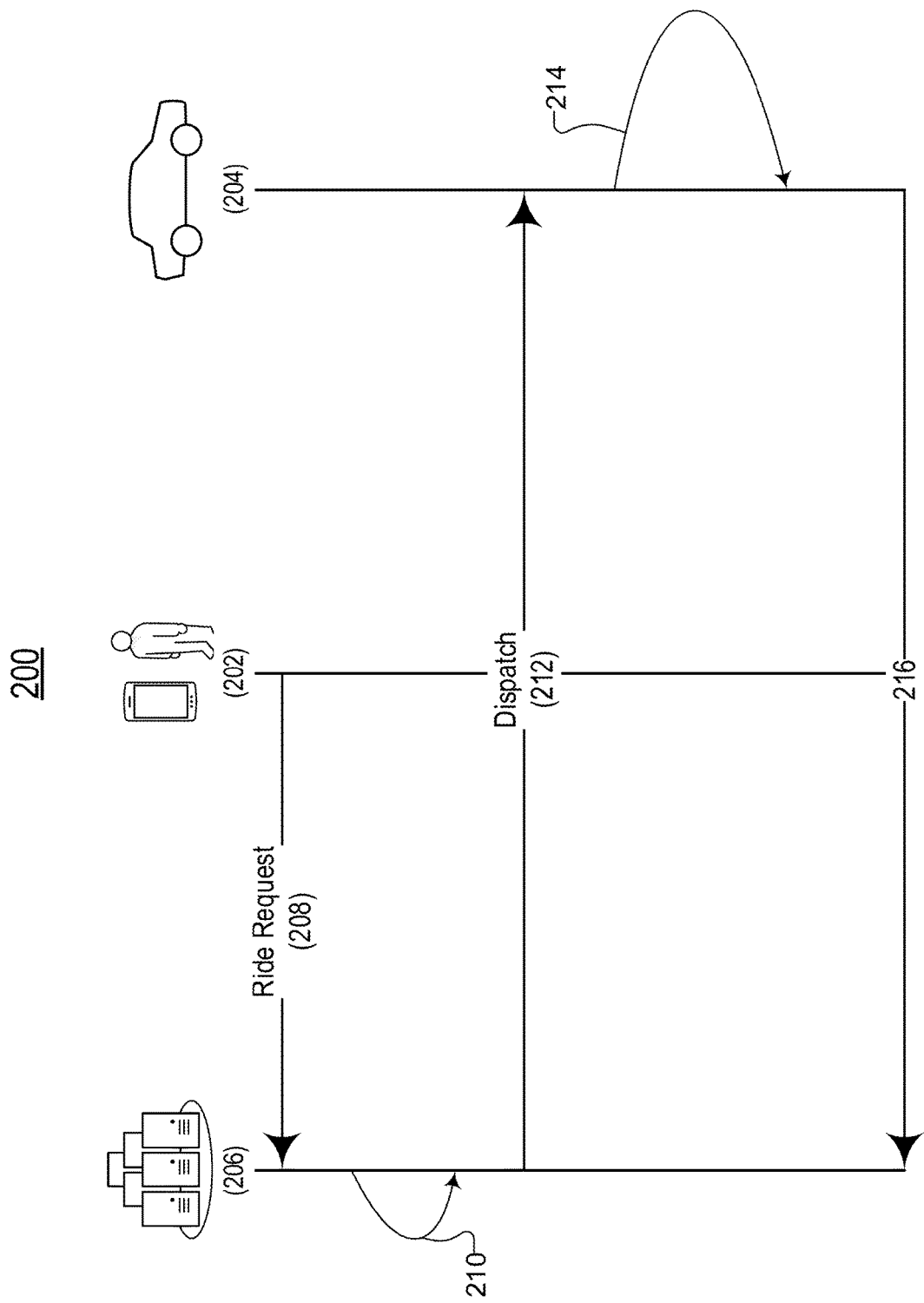
FIG. 2 illustrates an example timing diagram of various system communications that are relayed to implement a user/rider authentication process of the disclosed technology.

FIG. 2 illustrates an example timing diagram 200 of various system communications that are relayed between a rider (having a user device) 202, an AV (including a computing system) 204, and a remote AV management system 206, to implement a rider authentication process of the disclosed technology. Initially, a ride request 208 is initiated by a user having a user device 202. As used herein, user device 202 can include any of a variety of processor-based devices, including but not limited to: smartphones, smart watches, tablet computers, notebook computers, and/or personal computer (PCs), and the like. In some embodiments, rider request 208 can be initiated using a software application, for example, for a rider service associated with AV management system 206. As such, ride request 208, and other communications between user device 202 and AV management system 206, can be encrypted or transmitted using any of a variety of predetermined protocols to facilitate secure communication.

By way of example, ride request 208 can be generated by a mobile application ("app") on smartphone 202, for example, in response to user interactions with the app. Ride request 208 can include various information about the user and the user's preferences. For example, ride request 208 can include location information that is collected by user device 202, and that identifies a location of the associated user. In some aspects, location information may include Global Positioning System (GPS) coordinate data, an address, and/or map coordinate location information that identifies a location where the user/rider wishes to be picked up and/or dropped off.

Once received by AV management system 206, ride request 208 can be used to facilitate dispatch and user authentication procedures. For example, in step 210, AV management system 206 can identify and select an AV (e.g., AV 204) optimally suited for dispatch to the rider. Dispatch vehicle selection can be based on a location of the rider, as identified in the ride request 208 sent from user device 202. In other aspects, dispatch selection can be based on any number of combined factors including, but not limited to: AV type, AV repair condition, AV route, rider preferences, etc.

After a vehicle has been identified and selected for dispatch (210), AV management system 206 can transmit a dispatch command (also dispatch request) 212 to the selected AV 204. In some approaches, dispatch command 212 can include a recognition model for the user associated with ride request 208. That is, AV management system 206 can transfer a recognition model (unique to the requesting rider) to the selected AV 204. In some aspects, the recognition model may include one or more facial images, e.g., of the requesting rider. However, on other aspects, the recognition model can include a machine-learning model that has been trained using one or more facial images or images of facial features for the requesting driver. Dispatch command 212 can also include other types of data, including but not limited to: user preference information that identifies music, and/or route preferences, that can be used by AV 204 when providing service to rider 202. Dispatch command 212 can also include other types of data, such as a requested location of drop-off and/or driver history information.

Receipt of dispatch command 212 at AV 204 causes the AV to drive to the rider's indicated pick-up location. Upon arrival, image stream collection and authentication processes are be initiated (214). Image collection 214 can be triggered by different pre-conditions, depending on the preferred implementation. For example, image collection 214 can be initiated based on the arrival of AV 204 within a predetermined radial distance of the indicated pick-up location, e.g., based on a geo-fence. In other aspects, image collection and processing 214 can be triggered based on the detected approach of a pedestrian/rider toward AV 204. As discussed above with respect to FIG. 1, image collection devices (cameras) can be positioned in locations where pedestrian facial features are captured in the image stream. Processing of the image stream is performed by an AV computing system, such as AV computer 204 discussed above with respect to FIG. 2.

Processing of the collected image stream can include providing one or more digitized pedestrian facial images to the recognition model. In some aspects, the AV computer can perform pre-processing on images from the image stream. For example, digitized images may be adjusted (normalized) to compensate for various irregular qualities, such as lighting, angle, and/or image occlusion, etc. Images processed by the recognition model can be used to produce positive or negative identification matches. For example, images that do not contain facial features of the requesting rider will produce negative identification matches indicating that the subject of the image is not the correct rider. In some instances, failed rider identifications may be used to prompt other AV access alternatives, such as by pushing an unlock code to the rider's device or providing other instructions for AV entry. Alternatively, images that contain facial features of the correct rider will produce positive identification matches indicating that the requesting rider is proximately located to the AV. Positive authentication matches can be used by AV 204 to trigger various changes, such as unlocking one or more doors of the AV, adjusting temperature settings of the AV, playing specific music selections in the AV, etc.

In some aspects, positive rider authentications can trigger updates 216 that are sent to management system 206. By way of example, biometric data collected in an image stream at AV 204 can be provided as updates 216 to management system 206, and used to further refine the recognition model for the associated rider/user. In this way, each user associated recognition model can be improved/updated as the rider continues to use the ridesharing service. Periodic updates to rider associated recognition models also helps improve model accuracy, for example, by enabling the model to be updated as rider appearances change over time.

It is understood that the facial recognition models described herein can include any of a variety of machine-learning models that are trained and/or updated using biometric data, such as data representing facial features of one or more users/riders. In some aspects, recognition models used for authenticating a particular user can be trained using biometric data, such as facial images, of that user. As discussed in further detail below, further training/updating can occur using images/biometric data that is subsequently provided by the user, e.g., via a smart phone app, or that is obtained by an AV when performing a pick-up, e.g., that is received via an image stream collected by one or more AV cameras.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 3:
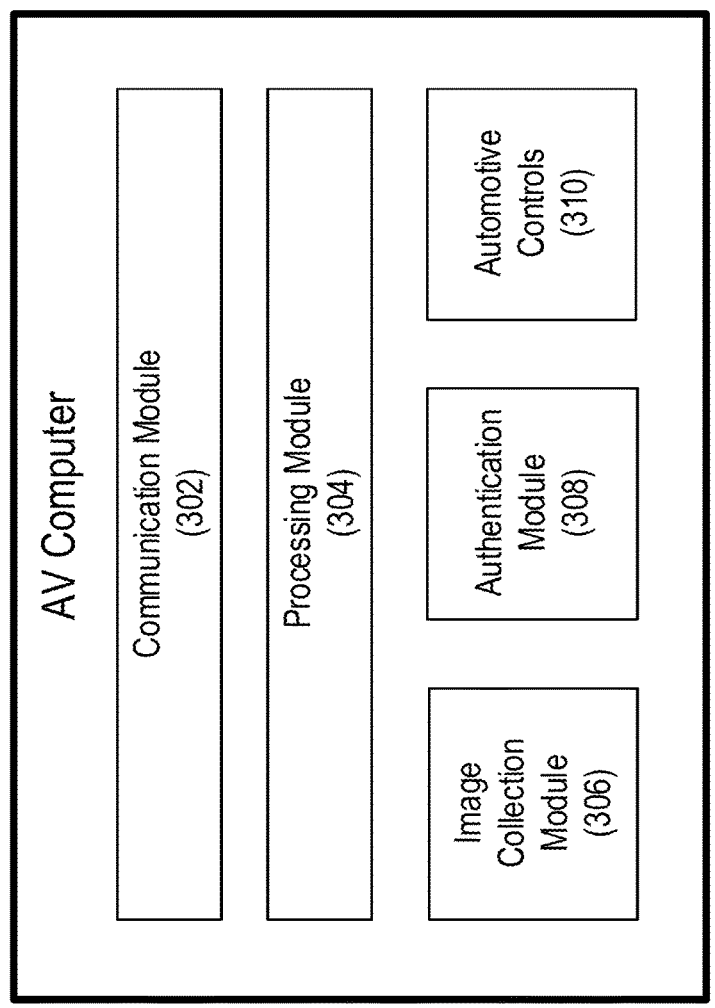
FIG. 3 illustrates an example of an AV computing system that can be configured to facilitate a process for using facial recognition to authenticate a user/rider, according to some aspects of the disclosed technology.

FIG. 3 illustrates an example of an AV computing system 300 that can be configured to facilitate a process for using facial recognition to authenticate a user/rider identification, according to some aspects of the disclosed technology. AV computer 300 includes a communication module 302 that is coupled to processing module 304. AV computer 300 also includes image collection module 306, authentication module 308, and automotive control module 310, all of which are also coupled to processing module 304.

Communication module 302 can include various wireless networking devices, for example, line cards, SIM cards and/or other radio-frequency (RF) transceivers configured to communicate with a wireless network. Communication module 302 can also include one or more Bluetooth radios, such as a Bluetooth Low Energy (BLE) radio. In practice, communication module 302 can be configured to wirelessly receive dispatch requests (e.g., from an AV management system), including one or more recognition models used to perform rider authentication.

Processing module 304 can include one or more processors, such as, CPU's and/or GPU's. In some aspects, processing module 304 may include one or more Application Specific Integrated Circuits (ASICs), for example, comprising architectures that are optimized for performing processing tasks that utilize machine-learning (ML) models, such as a facial recognition model of the disclosed technology.

Image collection module 306 can include a variety of image collection devices, e.g., CCD cameras, etc. In some aspects, image collection module can include one or more infrared cameras, flood illuminators, and/or dot projectors, for example, that are configured to record a 3D point-cloud of proximate objects, such as faces of approaching pedestrians.

Authentication module 308 can be configured to facilitate processing necessary to validate digitized pedestrian face data (received from image collection module 306) against a recognition model received via communication module 302. As discussed above, positive rider authentications can be used to trigger changes to various systems of an autonomous vehicle, such as unlocking one or more of the doors using automated control module 310.

Figure 4:
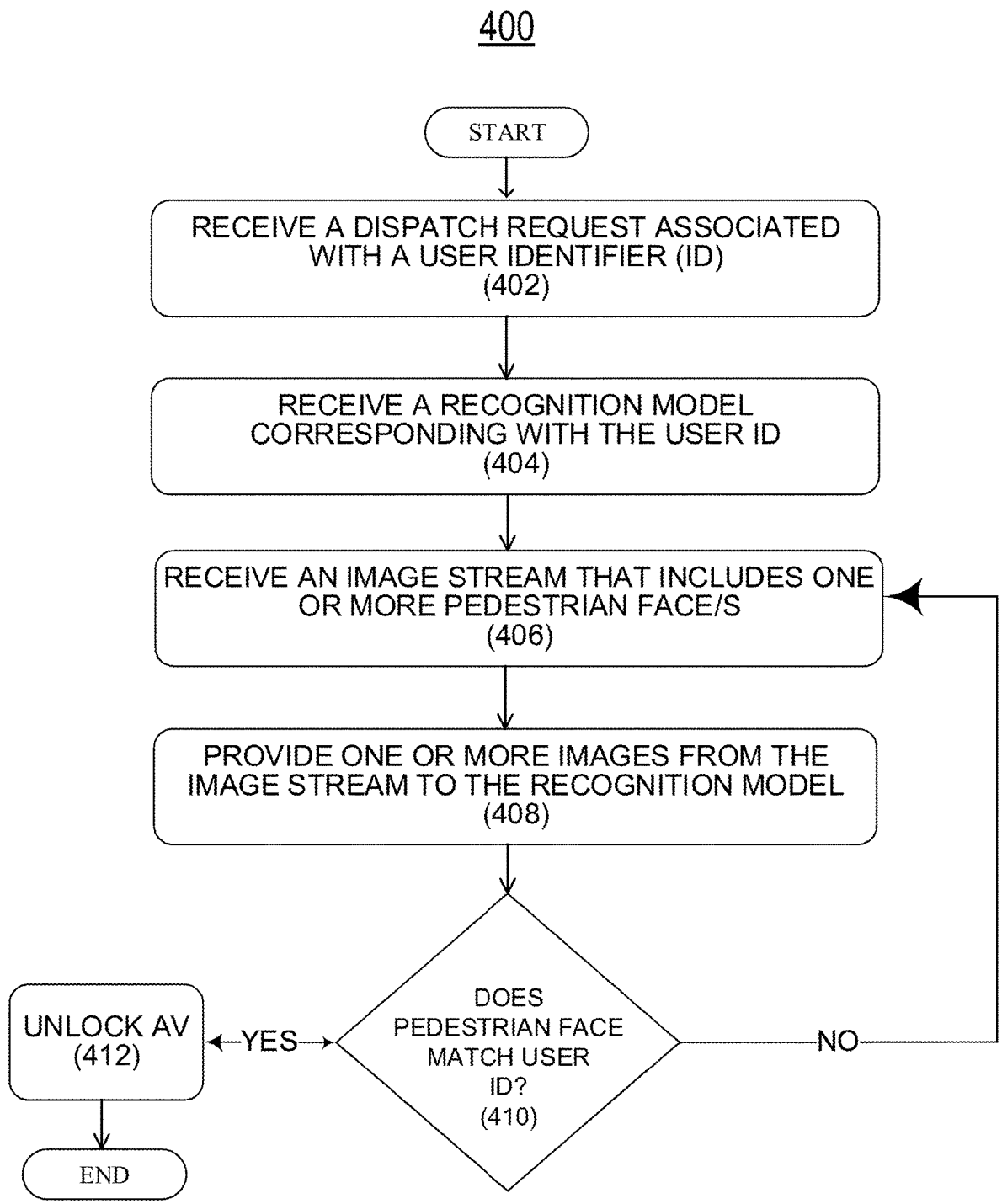
FIG. 4 illustrates an example process for using facial recognition to determine when to unlock doors of an AV, according to some aspects of the disclosed technology.

FIG. 4 illustrates an example process 400 for using facial recognition to determine when to unlock doors of an AV, according to some aspects of the disclosed technology. Process 400 begins with step 402, in which a dispatch request is received at an AV (e.g., at an AV computing system). As discussed above with respect to FIG. 2, the dispatch request can include a user ID that uniquely identifies a rider/user requesting an AV pick-up, as well as location information indicating a place where the rider is to be picked up and/or dropped off.

In some aspects, the dispatch request can include a recognition model corresponding with the requesting user's ID (404). Depending on the desired implementation, the recognition model may be provided as part of the dispatch request; alternatively, receipt of the dispatch request may cause the AV to issue a separate request for the necessary recognition model.

In response to the dispatch request, the AV can then drive to the indicated pick-up location, and begin retrieval of image streams from one or more cameras disposed on the AV (406). The retrieved image streams can include facial images of one or more pedestrians proximate to the AV. By way of example, the image streams may include facial images of a rider approaching the AV for entry.

In step 408, one or more of the images from the image stream are processed against the recognition model received in step 402. Processing of the one or more images is performed to determine if any of the surrounding pedestrian faces match with a user ID corresponding with the received recognition model. At step 410, a determination can be made as to whether be given image is positively validated by the recognition model. In instances where images fail authentication by the recognition model, step 410 loops back to step 406, and image stream collection is continued. Alternatively, in instances where images are positively authenticated by the recognition model, step 410 proceeds to step 412, and one or more doors of the AV are unlocked, e.g., to permit entry by the authenticated rider.

Figure 5:
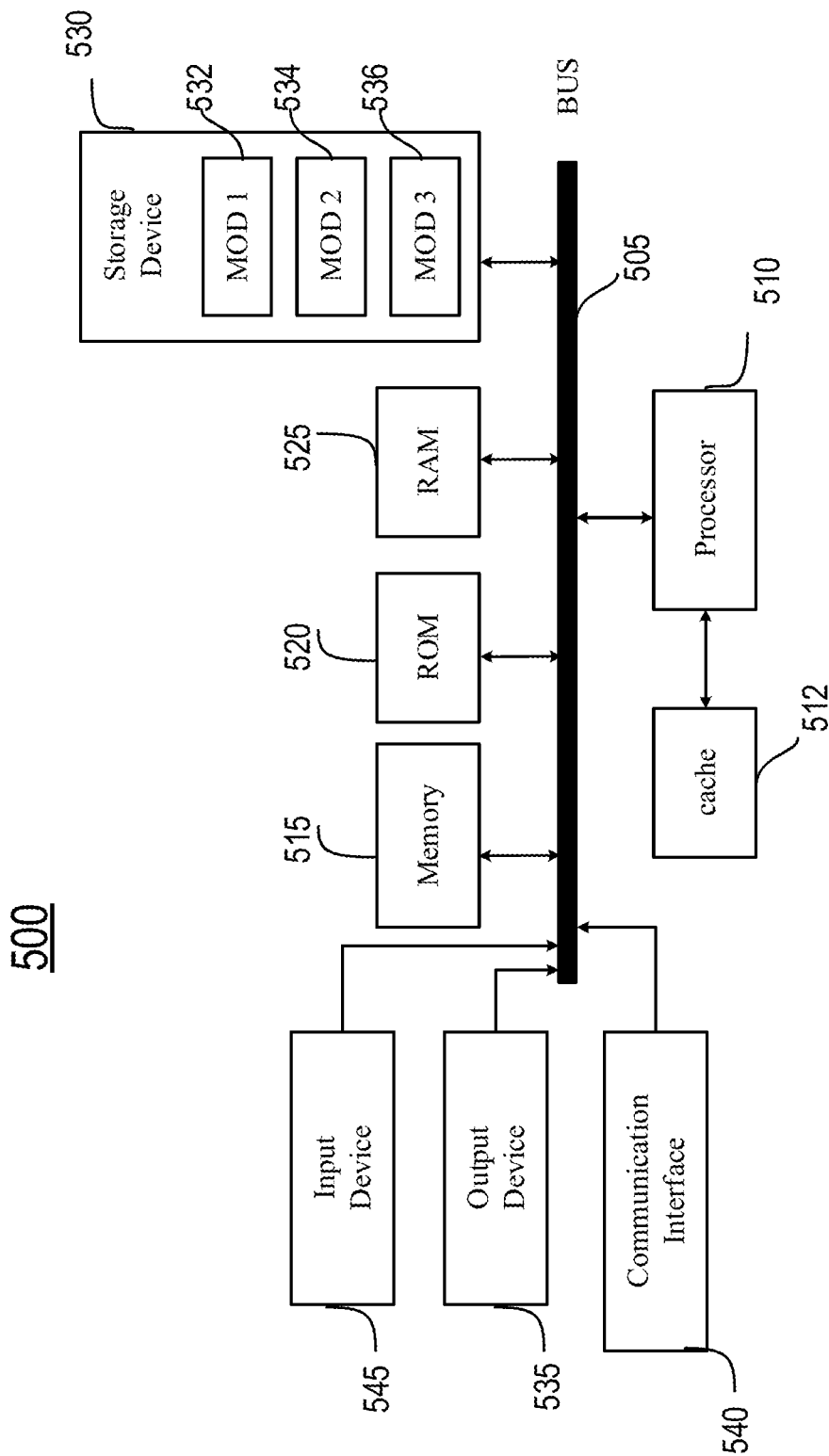
FIG. 5 illustrates an example processor-based system with which some aspects of the subject technology can be implemented.

FIG. 5 illustrates an example processor-based system with which some aspects of the subject technology can be implemented. Specifically, FIG. 5 illustrates system architecture 500 wherein the components of the system are in electrical communication with each other using a bus 505. System architecture 500 can include a processing unit (CPU or processor) 510, as well as a cache 512, that are variously coupled to system bus 505. Bus 505 couples various system components including system memory 515, (e.g., read only memory (ROM) 520 and random access memory (RAM) 525, to processor 510.

System architecture 500 can include a cache of high-speed memory connected directly with, in close proximity to, or integrated as part of the processor 510. System architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. Memory 515 can include multiple different types of memory with different performance characteristics. Processor 510 can include any general purpose processor and a hardware module or software module, such as module 1 (532), module 2 (534), and module 3 (536) stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms. In some instances, multimodal systems can enable a user to provide multiple types of input to communicate with the computing system architecture 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include software modules 532, 534, 536 for controlling processor 510. Other hardware or software modules are contemplated. Storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out various functions of the disclosed technology.

By way of example, instruction stored on computer-readable media can be configured to cause one or more processors to perform operations including: receiving, at an AV computing system, a first dispatch request, wherein the first dispatch request is associated with a first user identifier (ID), receiving, at the AV computing system, a first recognition model, wherein the first recognition model corresponds with the first user ID, receiving, at the AV computing system, an image stream comprising one or more images of pedestrian faces, and providing the one or more images to the first recognition model. In some aspects, the instructions can further cause processors 510 to perform operations for: determining, using the first recognition model, if a first user represented in the one or more images corresponds with the first user ID, unlocking a door of the AV in response to a match between at least one of the one or more images and the first user ID, and/or updating the first recognition model in response to a match between at least one of the one or more images and the first user ID.

In some aspects, memory stored operations/instructions can be configured to further cause processors 510 to perform operations for: receiving a second recognition model corresponding with a second user ID, providing the one or more images to the second recognition model, and determining, using the second recognition model, if a second user represented by the one or more images corresponds with the second user ID. In some approaches, the operations may further cause the processors to perform operations for unlocking a door of the AV in response to a match between at least one of the one or more images and the second user ID.

Depending on the desired implementation, the first recognition model can be a machine-learning model that has been trained using a plurality of facial images of the first user, and wherein the second recognition model is a machine-learning model that has been trained using a plurality of facial images of the second user.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for automatically unlocking an autonomous vehicle (AV), comprising:
    receiving, at an AV computing system on the AV, a first dispatch request, wherein the first dispatch request is associated with a first user identifier (ID);
    receiving, at the AV computing system, a first recognition model selected from a plurality of recognition models based on the first user ID, wherein the first recognition model corresponds with the first user ID, and wherein the first recognition model is a machine-learning model that has been trained using a plurality of facial images of a first user corresponding with the first user ID, wherein the first user ID comprises first geo-location coordinates associated with the first user;
    collecting, at the AV computing system, an image stream comprising one or more images of pedestrian faces, in response to a detected arrival of the AV to a location indicated by the first dispatch request;
    providing, at the AV computing system, the one or more images to the first recognition model;
    determining, using the first recognition model, if the first user is represented in the one or more images of pedestrian faces at the AV computing system; and
    unlocking a door of the AV in response to a match between at least one of the one or more images and the first user ID.

2. The computer-implemented method of claim 1, further comprising:
    updating the first recognition model in response to a match between at least one of the one or more images and the first user ID.

3. The computer-implemented method of claim 1, further comprising:
    receiving a second recognition model corresponding with a second user ID;
    providing the one or more images to the second recognition model;
    determining, using the second recognition model, if a second user represented by the one or more images corresponds with the second user ID; and
    unlocking a door of the AV in response to a match between at least one of the one or more images and the second user ID.

4. The computer-implemented method of claim 3, wherein the second recognition model is a machine-learning model that has been trained using a plurality of facial images of the second user.

5. The computer-implemented method of claim 1, wherein the image stream is received from a charge-coupled device (CCD) mounted to the AV.

6. A system for automatically unlocking an autonomous vehicle (AV), comprising:
    one or more processors;
    an image detection device coupled to the one or more processors; and
    a computer-readable medium comprising instructions stored therein, which when executed by the processors, cause the processors to perform operations comprising:
        receiving, at an AV computing system on the AV, a first dispatch request, wherein the first dispatch request is associated with a first user identifier (ID);
        receiving, at the AV computing system, a first recognition model selected from a plurality of recognition models based on the first user ID, wherein the first recognition model corresponds with the first user ID, and wherein the first recognition model is a machine-learning model that has been trained using a plurality of facial images of a first user corresponding with the first user ID, wherein the first user ID comprises first geo-location coordinates associated with the first user;
        collecting an image stream comprising one or more images of pedestrian faces, in response to a detected arrival of the AV to a location indicated by the first dispatch request;
        providing, at the AV computing system, the one or more images to the first recognition model;
        determining if the first user is represented in the one or more images of pedestrian faces at the AV computing system; and
        unlocking a door of the AV in response to a match between at least one of the one or more images and the first user ID.

7. The system of claim 6, wherein the processors are further configured to perform operations comprising:
    updating the first recognition model in response to a match between at least one of the one or more images and the first user ID.

8. The system of claim 6, wherein the processors are further configured to perform operations comprising:
    receiving a second recognition model corresponding with a second user ID;
    providing the one or more images to the second recognition model;
    determining, using the second recognition model, if a second user represented by the one or more images corresponds with the second user ID; and
    unlocking a door of the AV in response to a match between at least one of the one or more images and the second user ID.

9. The system of claim 8, wherein the second recognition model is a machine-learning model that has been trained using a plurality of facial images of the second user.

10. The system of claim 6, wherein the image stream is received from a charge-coupled device (CCD) mounted to the AV.

11. A non-transitory computer-readable storage medium comprising instructions stored therein, which when executed by one or more processors, cause the processors to perform operations comprising:

receiving, at an autonomous vehicle (AV), a first dispatch request, wherein the first dispatch request is associated with a first user identifier (ID);

receiving a first recognition model selected from a plurality of recognition models based on the first user ID, wherein the first recognition model corresponds with the first user ID, and wherein the first recognition model is a machine-learning model that has been trained using a plurality of facial images of a first user corresponding with the first user ID, wherein the first user ID comprises first geo-location coordinates associated with the first user;

collecting, at the AV, an image stream comprising one or more images of pedestrian faces, in response to a detected arrival of the AV to a location indicated by the first dispatch request;

providing, at the AV, the one or more images to the first recognition model;

determining, using the first recognition model, if the first user is represented in the one or more images of pedestrian faces at the AV; and unlocking a door of the AV in response to a match between at least one of the one or more images and the first user ID.

12. The non-transitory computer-readable storage medium of claim 11, wherein the processors are further configured to perform operations comprising:

updating the first recognition model in response to a match between at least one of the one or more images and the first user ID.

13. The non-transitory computer-readable storage medium of claim 12, wherein the processors are further configured to perform operations comprising:

receiving a second recognition model corresponding with a second user ID;

providing the one or more images to the second recognition model;

determining, using the second recognition model, if a second user represented by the one or more images corresponds with the second user ID; and unlocking a door of an autonomous vehicle (AV) in response to a match between at least one of the one or more images and the second user ID.

14. The non-transitory computer-readable storage medium of claim 13, wherein the second recognition model is a machine-learning model that has been trained using a plurality of facial images of the second user.

* * * * *